(12) United States Patent
Yukimasa et al.

(10) Patent No.: US 10,516,176 B2
(45) Date of Patent: Dec. 24, 2019

(54) POWER GENERATION SYSTEM

(71) Applicant: Panasonic Intellectual Property Management Co., Ltd., Osaka (JP)

(72) Inventors: Akinori Yukimasa, Osaka (JP); Hiroshi Tatsui, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1223 days.

(21) Appl. No.: 14/399,478

(22) PCT Filed: May 8, 2013

(86) PCT No.: PCT/JP2013/002946
§ 371 (c)(1),
(2) Date: Nov. 6, 2014

(87) PCT Pub. No.: WO2013/168412
PCT Pub. Date: Nov. 14, 2013

(65) Prior Publication Data
US 2015/0099202 A1 Apr. 9, 2015

(30) Foreign Application Priority Data

May 8, 2012 (JP) .................................. 2012-106846

(51) Int. Cl.
*H01M 8/04119* (2016.01)
*F23L 17/00* (2006.01)
(Continued)

(52) U.S. Cl.
CPC ....... *H01M 8/04179* (2013.01); *F23L 17/005* (2013.01); *H01M 8/04156* (2013.01);
(Continued)

(58) Field of Classification Search
CPC ......... H01M 8/04179; H01M 8/04156; H01M 8/04514; H01M 8/04955; F23L 17/005
See application file for complete search history.

(56) References Cited

U.S. PATENT DOCUMENTS

| 2004/0229098 A1* | 11/2004 | Fujita | H01M 8/04164 |
| | | | 429/414 |
| 2009/0123795 A1* | 5/2009 | Chuah | H01M 8/04156 |
| | | | 429/414 |
| 2012/0077097 A1 | 3/2012 | Kokubu et al. | |

FOREIGN PATENT DOCUMENTS

| JP | 06-267580 A | 9/1994 |
| JP | 2006-253020 A | 9/2006 |
| | (Continued) | |

OTHER PUBLICATIONS

JP2010238471A Original and Translation from Espacenet.*
(Continued)

*Primary Examiner* — Barbara L Gilliam
*Assistant Examiner* — Nathanael T Zemui
(74) *Attorney, Agent, or Firm* — McDermott Will & Emery LLP

(57) ABSTRACT

A power generation system includes: a power generation unit configured to discharge a flue gas; a housing configured to accommodate the power generation unit; a ventilator configured to ventilate the housing; a first gas channel through which a gas discharged from the ventilator flows; a second gas channel through which the flue gas from the power generation unit flows; a merging portion where the first gas channel and the second gas channel merge; a third gas channel through which the gases merged at the merging portion flow; a water trap unit connected to the first gas channel and including a water sealing structure; and a water
(Continued)

discharge channel through which water in the water trap unit is discharged to an outside of the housing.

11 Claims, 5 Drawing Sheets

(51) Int. Cl.
    *H01M 8/04955*    (2016.01)
    *H01M 8/04492*    (2016.01)
    *H01M 8/0438*     (2016.01)

(52) U.S. Cl.
    CPC ... *H01M 8/04514* (2013.01); *H01M 8/04955* (2013.01); *F23J 2900/13004* (2013.01); *H01M 8/04425* (2013.01)

(56) References Cited

FOREIGN PATENT DOCUMENTS

| | | | |
|---|---|---|---|
| JP | 2008-170097 A | | 7/2008 |
| JP | 2010-238471 A | | 10/2010 |
| JP | 2010238471 A | * | 10/2010 |

OTHER PUBLICATIONS

Extended European Search Report issued in European Application No. 13788592.7, dated Feb. 12, 2015.
International Search Report issued in PCT/JP2013/002946, dated Jul. 16, 2013, with English translation.

* cited by examiner

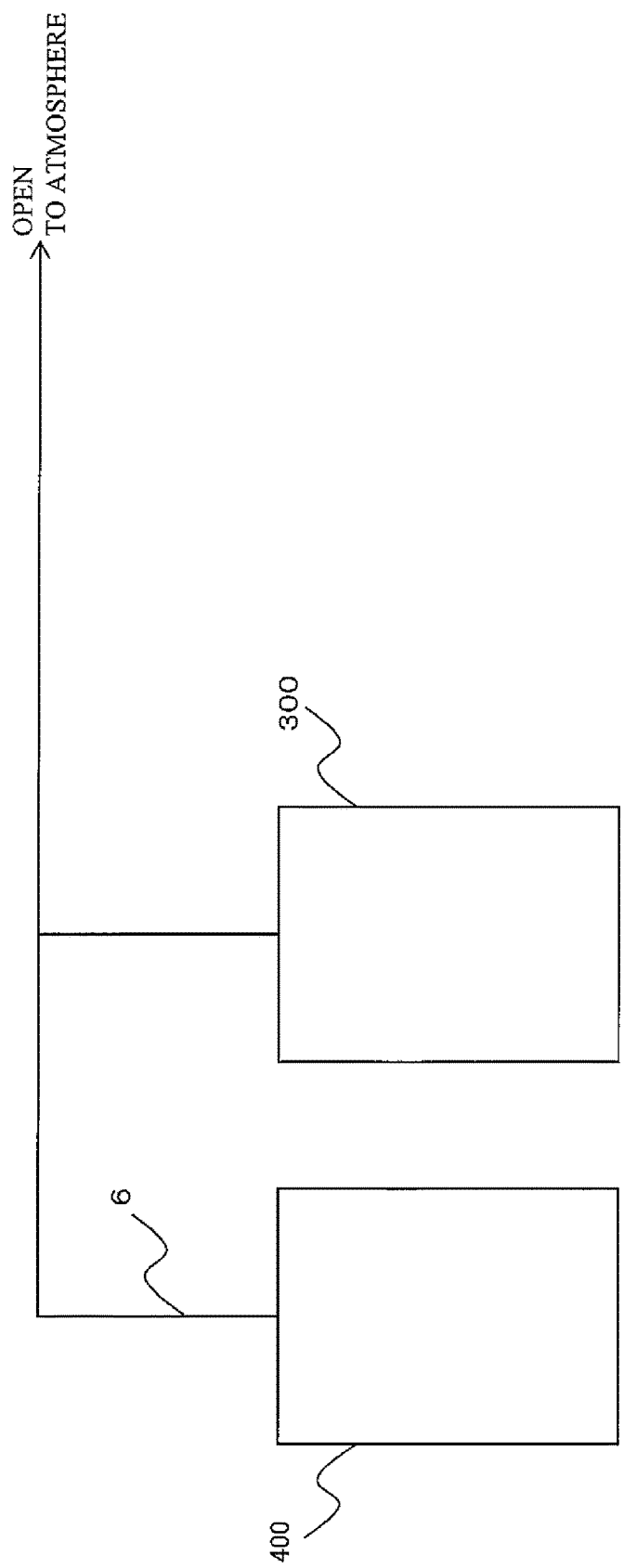

POWER GENERATION SYSTEM

RELATED APPLICATIONS

This application is the U.S. National Phase under 35 U.S.C. § 371 of International Application No. PCT/JP2013/002946, filed on May 8, 2013, which in turn claims the benefit of Japanese Application No. 2012-106846, filed on May 8, 2012, the disclosures of which Applications are incorporated by reference herein.

TECHNICAL FIELD

The present invention relates to a power generation system. More specifically, the present invention relates to a power generation system including a power generation unit configured to discharge a flue gas.

BACKGROUND ART

PTL 1 discloses a package type fuel cell power generator installed at an indoor site. The fuel cell power generator disclosed in PTL 1 condenses steam, contained in a system exhaust gas discharged from a fuel processing device and a fuel cell main body, to recover the condensed water in a water tank through a drain pipe. PTL 1 describes that water seal is realized by securing a water level in the water tank, so that the condensed water can be prevented from flowing backward to an inside of the main body.

CITATION LIST

Patent Literature

PTL 1: Japanese Laid-Open Patent Application Publication No. 2006-253020

SUMMARY OF INVENTION

Technical Problem

According to the above conventional configuration, there is a possibility that the exhaust gas is discharged from a portion other than an original exhaust system. The portion from which the exhaust gas may be discharged has to be arranged at such a position that problems caused by the exhaust gas do not occur, and this may become a restriction on design.

The present invention was made to solve the above conventional problems, and an object of the present invention is to provide a power generation system configured such that a possibility that a flue gas from a power generation unit is discharged from a portion other than an original flue gas system can be made lower than a conventional possibility.

Solution to Problem

A power generation system according to one aspect of the present invention includes: a power generation unit configured to discharge a flue gas; a housing configured to accommodate the power generation unit; a ventilator configured to ventilate the housing; a first gas channel through which a gas discharged from the ventilator flows; a second gas channel through which the flue gas from the power generation unit flows; a merging portion where the first gas channel and the second gas channel merge; a third gas channel through which the gases merged at the merging portion flow; a water trap unit connected to the first gas channel, arranged at a position lower than the merging portion, and including a water sealing structure; and a water discharge channel through which water in the water trap unit is discharged to an outside of the housing, and the ventilator is configured to operate at least during power generation.

Advantageous Effects of Invention

The aspect of the present invention has an effect of being able to provide the power generation system configured such that the possibility that the flue gas from the power generation unit is discharged from the portion other than the original flue gas system can be made lower than the conventional possibility.

BRIEF DESCRIPTION OF DRAWINGS

FIG. 5 is a block diagram showing one example of a schematic configuration of the power generation system according to Embodiment 4.

DESCRIPTION OF EMBODIMENTS

Figure 1:
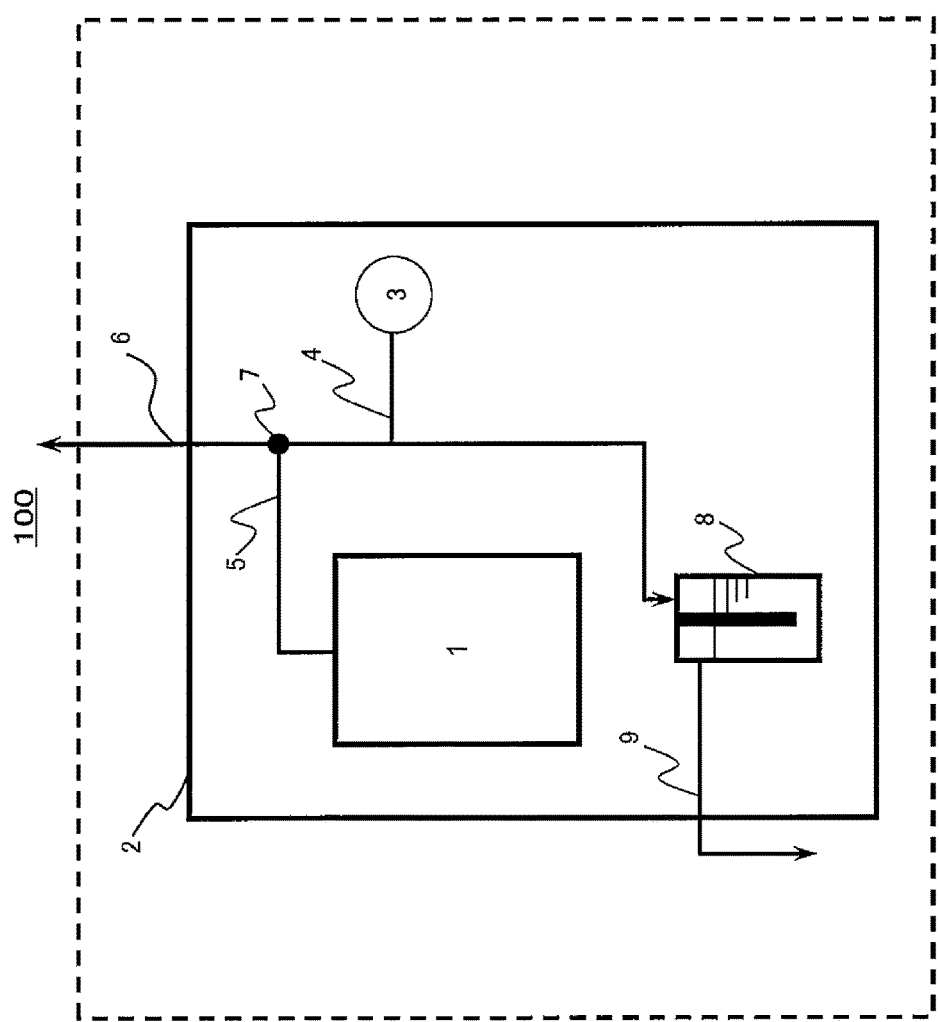
FIG. 1 is a block diagram showing one example of a schematic configuration of a power generation system according to Embodiment 1.

A fuel cell system includes: a reformer configured to generate a hydrogen-containing fuel gas by a steam-reforming reaction from a raw material, such as a city gas or a natural gas, supplied from an infrastructure; and a fuel cell configured to generate power by an electrochemical reaction by supplying the hydrogen-containing fuel gas, generated by the reformer, to an anode and supplying an oxidizing gas to a cathode.

The fuel cell and the reformer need to be heated in some cases, so that a combustor is provided for the heating in many cases. Since a flue gas discharged from the combustor contains a large amount of moisture, a water discharge mechanism is provided so as to discharge condensed water, derived from the moisture, to an outside of the fuel cell system. In this case, the flue gas may be discharged to the outside through the water discharge mechanism.

As long as the flue gas is discharged from the original flue gas system, no problem occurs. However, problems may occur if the flue gas is discharged from a portion other than the flue gas system.

For example, in a case where the fuel cell system is installed at an outdoor site, the flue gas is diluted by outside air. Therefore, big problems may not occur, but problems occur in some cases.

For example, the flue gas contains carbon monoxide in some cases. In order to reduce a possibility that the carbon monoxide flows into an indoor site, a distance between a window communicating with the indoor site and an exhaust port has to be a certain distance or more in some cases. If the possibility that the flue gas is discharged through the water discharge mechanism is high, the arrangement position of the water discharge mechanism is restricted, and the design of the fuel cell system becomes difficult in some cases.

For example, the flue gas tends to become high in temperature, and a required distance relative to combustibles needs to be maintained. The above distance is secured in a case where the flue gas is discharged from the original flue gas system, but if the flue gas is discharged from the portion other than the original flue gas system, the required distance relative to the combustibles may not be able to be maintained. Therefore, if the possibility that the flue gas is discharged through the water discharge mechanism is high, the arrangement position of the water discharge mechanism is restricted, and the design of the fuel cell system becomes difficult in some cases.

In a case where the fuel cell system is installed at the indoor site, the fuel cell system is designed such that the flue gas discharged from the original flue gas system is not discharged to the indoor site. However, if the flue gas is discharged from the portion other than the original flue gas system, problems, such as ignition to combustibles, offensive odor, and carbon monoxide, may occur. Therefore, as with the above, the discharge of the flue gas through the water discharge mechanism to the outside may become a restriction on design.

As a result of the studies by the present inventors, according to the configuration of PTL 1 (FIG. 7), water seal is realized by securing a water level in a route through which the condensed water is discharged, so that the flue gas is prevented from flowing to the indoor site.

However, according to the above conventional configuration, if the water seal function is impaired for some reason, the flue gas may flow out through the water discharge mechanism to an outside of the fuel cell power generator. Examples of the case where the water seal function is impaired include: a case where a worker forgets to fill the water tank with the water at the time of the installation or maintenance of the fuel cell system; a case where water leakage from the water tank occurs; and a case where a phenomenon occurs, in which the water in the water tank is discharged since pressure (back pressure) in an inner pipe of a double pipe duct increases beyond the scope of the assumption by clogging of the inner pipe or strong wind blowing to the inner pipe, and the pressure in the inner pipe exceeds a water pressure difference corresponding to a water seal height in the water tank. The problems caused when the water seal function is impaired are common among the power generation systems including power generation units configured to discharge the flue gas. Examples of the power generation units include power generators including fuel cells or engines, such as, gas engines, diesel engines, and stirling engines.

To solve the above problems, the present inventors have arrived at a configuration in which: a first gas channel through which a gas discharged from a ventilator flows and a second gas channel through which a flue gas from a power generation unit flows merge at a merging portion; and a water trap unit connected to the first gas channel located upstream of the merging portion, provided at a position lower than the merging portion, and including a water sealing structure and a water discharge channel through which the water in the water trap unit is discharged to the outside of a housing are included.

According to this configuration, a possibility that the flue gas flows into the first gas channel located upstream of the merging portion is reduced by the gas discharged from the ventilator. Therefore, the possibility that the flue gas from the power generation unit is discharged from the portion other than the original flue gas system can be made lower than the conventional possibility.

Embodiment 1

A power generation system of Embodiment 1 includes: a power generation unit configured to discharge a flue gas; a housing configured to accommodate the power generation unit; a ventilator configured to ventilate the housing; a first gas channel through which a gas discharged from the ventilator flows; a second gas channel through which the flue gas from the power generation unit flows; a merging portion where the first gas channel and the second gas channel merge; a third gas channel through which the gases merged at the merging portion flow; a water trap unit connected to the first gas channel and including a water sealing structure; and a water discharge channel through which water in the water trap unit is discharged to an outside of the housing.

According to this configuration, the possibility that the flue gas from the power generation unit is discharged from the portion other than the original flue gas system can be made lower than the conventional possibility.

In the above power generation system, the water trap unit may be arranged at a position lower than the merging portion.

According to this configuration, since the condensed water generated from the flue gas is stored in the water trap unit, the water seal function can be automatically maintained.

In the above power generation system, the ventilator may be configured to operate during at least a part of a period in which the flue gas discharged from the power generation unit flows through the second gas channel and the third gas channel.

In the above power generation system, the ventilator may be configured to operate at least during a part of power generation.

Device Configuration

FIG. 1 is a block diagram showing one example of a schematic configuration of a power generation system according to Embodiment 1.

A power generation system 100 of the present embodiment includes a power generation unit 1, a housing 2, a ventilator 3, a first gas channel 4, a second gas channel 5, a merging portion 7, a third gas channel 6, a water trap unit 8, a water discharge channel 9.

The power generation unit 1 discharges the flue gas. Specifically, examples of the power generation unit 1 include fuel cell units and engine power generation units including gas engines, diesel engines, or stirling engines. In the fuel cell unit, the flue gas may be discharged from a combustor configured to combust a hydrogen-containing gas. In the engine power generation unit, the flue gas may be discharged from an internal combustion engine or an external combustion engine.

In a case where the power generation unit 1 is a fuel cell unit configured to generate power by using the hydrogen-containing gas, the fuel cell may be any type of fuel cell. Examples of the fuel cell include a polymer electrolyte fuel cell, a solid-oxide fuel cell, and a phosphoric-acid fuel cell. The fuel cell unit may include a hydrogen generator, and the fuel cell may generate power by using the hydrogen-containing gas supplied from the hydrogen generator. In a case when the fuel cell is the solid-oxide fuel cell, the hydrogen generator and the fuel cell may be accommodated in a single container.

The housing 2 accommodates the power generation unit 1.

The ventilator 3 ventilates the housing. For example, the ventilator 3 may be constituted by a blower, a ventilation fan, or the like. For example, the ventilator 3 takes air from the outside of the housing 2 and discharges the air to the first gas channel 4. The ventilator 3 may indirectly take the air from the outside of the housing 2 through an internal space of the housing 2.

The first gas channel 4 is a channel through which the gas discharged from the ventilator 3 flows. More specifically, in the example shown in FIG. 1, the first gas channel 4 is a channel extending from the ventilator 3 to the merging portion 7.

The second gas channel 5 is a channel through which the flue gas from the power generation unit 1 flows. More specifically, in the example shown in FIG. 1, the second gas channel 5 is a channel extending from the power generation unit 1 to the merging portion 7.

The merging portion 7 is a portion where the first gas channel 4 and the second gas channel 5 merge.

The third gas channel 6 is a channel through which the gases merged at the merging portion 7 flow. More specifically, for example, the third gas channel 6 may be a channel whose downstream end is open to the atmosphere. To be specific, the third gas channel 6 may be a channel that connects the merging portion 7 to the atmosphere. Or, the third gas channel 6 may be a channel whose downstream end is connected to a smoke path. To be specific, the third gas channel 6 may be a channel that connects the merging portion 7 to the smoke path.

The water trap unit 8 is connected to the first gas channel 4 and includes the water sealing structure. In the example shown in FIG. 1, the water trap unit 8 is connected to the first gas channel 4 by a branch channel branching from the first gas channel 4 at a branch portion. For example, the water sealing structure may be a water tank or a U-shaped pipe. A positional relation between the merging portion 7 and the water trap unit 8 is not especially limited. For example, the water trap unit 8 may be provided at a position that is the same in height as the merging portion 7, higher than the merging portion 7, or lower than the merging portion 7. In a case where the water trap unit 8 is provided at the position lower than the merging portion 7, the condensed water generated from the flue gas is stored in the water trap unit 8, so that the water seal function can be automatically maintained.

In the example shown in FIG. 1, the water trap unit 8 includes a water tank including a first chamber and a second chamber. A dividing wall is provided between the first chamber and the second chamber, and the first chamber and the second chamber communicate with each other through a communication opening located at a lower position of the water trap unit 8. In this example, the communication opening is formed between the dividing wall and a bottom surface of the water trap unit 8. However, the present embodiment is not limited to this example. As long as the communication opening is provided at the lower position of the water trap unit 8, the communication opening may be any opening. For example, the dividing wall may contact the bottom surface, and the communication opening may be an opening formed at a lower portion of the dividing wall. In this example, the water sealing structure is formed by storing the condensed water in the water trap unit 8 such that the water level becomes higher than at least the communication opening.

The water is stored in the first chamber and the second chamber. An upper space of the first chamber communicates with the merging portion 7, and an upper space of the second chamber communicates with the water discharge channel 9. The gas pressure on the water surface in the second chamber is equal to the gas pressure at an exit of the water discharge channel and is substantially equal to the atmospheric pressure. In contrast, the gas pressure on the water surface in the first chamber changes depending on, for example, the discharge pressure of the ventilator 3. A difference between the water levels of the first and second chambers, that is, a so-called water head difference corresponds to water seal pressure.

The water stored in the first chamber and the second chamber may be the condensed water or water, such as city water, supplied from an outside of the power generation system.

In this example, the water trap unit 8 is connected to the first gas channel 4 through the branch channel branching from the first gas channel 4. However, the branch channel is not essential. For example, the water trap unit 8 may be disposed on the first gas channel 4.

The water discharge channel 9 is a channel through which the water in the water trap unit 8 is discharged to the outside of the housing 2.

The power generation system 100 may include a controller, not shown. The controller is only required to have a control function. For example, the controller may include a calculation processing portion (not shown) and a storage portion (not shown) configured to store a control program. Examples of the calculation processing portion are an MPU and a CPU. One example of the storage portion is a memory. The controller may be constituted by a single controller configured to perform centralized control or may be constituted by a plurality of controllers that cooperate to perform distributed control.

In the present embodiment, the gas discharged from the ventilator 3 flows toward the merging portion 7 to flow through the third gas channel 6 together with the flue gas. Regardless of whether or not the flue gas is being discharged from the power generation unit 1, the flue gas from the power generation unit 1 may exist in the second gas channel 5 and the third gas channel 6.

To be specific, in a case when the flue gas is being discharged from the power generation unit 1, the flue gas discharged from the power generation unit 1 flows through the second gas channel 5 and the third gas channel 6. Even in a case where the flue gas is not being discharged from the power generation unit 1, the flue gas may not be completely discharged from the second gas channel 5 and the third gas channel 6 to the outside of the power generation system 100 and may remain in the second gas channel 5 and the third gas channel 6. In these cases, the flue gas may flow into the water trap unit 8, for example, in a case where the flue gas diffuses or in a case where the pressure at the exit of the third gas channel 6 (for example, at an exhaust port of the third gas channel 6 in a case when the third gas channel 6 is open to the atmosphere) increases by the influence of wind.

In any cases, even if the water seal function of the water trap unit 8 is impaired by the gas discharged from the ventilator 3, that is, even if the water sealing structure of the water trap unit 8 is broken by the gas discharged from the ventilator 3, the flue gas from the power generation unit 1 hardly flows into the route extending between the ventilator 3 and the merging portion 7. Therefore, even if the water sealing structure is broken, the possibility that the flue gas leaks through the water trap unit 8 to the outside is made lower than the conventional possibility.

On this account, the possibility that the flue gas from the power generation unit 1 is discharged from the water discharge channel 9 that is the portion other than the original flue gas system that is the third gas channel can be made lower than the conventional possibility.

An operation timing of the ventilator 3 is not especially limited.

For example, the ventilator 3 may be configured to operate during at least a part of a period in which the flue gas discharged from the power generation unit 1 flows through the second gas channel 5 and the third gas channel 6. For example, the ventilator 3 may be configured to operate at least during a part of power generation.

The period in which the flue gas discharged from the power generation unit 1 flows through the second gas channel 5 and the third gas channel 6 is not limited to the period of the power generation of the power generation system 100 and may be any period as long as it is a period in which the flue gas is discharged from the power generation unit 1. Specifically, for example, the period in which the flue gas discharged from the power generation unit 1 flows through the second gas channel 5 and the third gas channel 6 may contain at least one of the period of the start-up of the power generation system 100 and the period of the stop of the power generation system 100.

Since the ventilator 3 operates during at least a part of the period in which the flue gas flows through the second gas channel 5 and the third gas channel 6, the possibility that the flue gas leaks through the water trap unit 8 to the outside is reduced.

The ventilator 3 may be configured to operate during at least a part of a period in which the flue gas discharged from the power generation unit 1 does not flow through the second gas channel 5 or the third gas channel 6.

The period in which the flue gas does not flow through the second gas channel 5 or the third gas channel 6 may contain, for example, a period in which the power generation system 100 is not generating the power. Specifically, for example, the period in which the flue gas does not flow through the second gas channel 5 or the third gas channel 6 may contain at least one of the period of the start-up of the power generation system 100 and the period of the stop of the power generation system 100.

Since the ventilator 3 operates during at least a part of the period in which the flue gas does not flow through the second gas channel 5 or the third gas channel 6, the possibility that the flue gas leaks through the water trap unit 8 to the outside is reduced.

The ventilator 3 may be or may not be configured to be operated by the controller. For example, the ventilator 3 may be configured to operate at all times in such a manner that by turning on the power generation system, power is also supplied to the ventilator 3. To be specific, as long as the ventilator 3 is configured to operate, any configuration is adoptable.

Embodiment 2

The power generation system of Embodiment 2 includes: a power generation unit configured to discharge a flue gas; a housing configured to accommodate the power generation unit; a ventilator configured to ventilate the housing; a first gas channel through which a gas discharged from the ventilator flows; a second gas channel through which the flue gas from the power generation unit flows; a merging portion where the first gas channel and the second gas channel merge; a third gas channel through which the gases merged at the merging portion flow; a water trap unit connected to the first gas channel, arranged at a position lower than the merging portion, and including a water sealing structure; and a water discharge channel through which water in the water trap unit is discharged to an outside of the housing, and the ventilator is configured to operate at least during power generation.

According to this configuration, the possibility that the flue gas from the power generation unit is discharged from the portion other than the original flue gas system can be made lower than the conventional possibility.

Device Configuration

Figure 2:
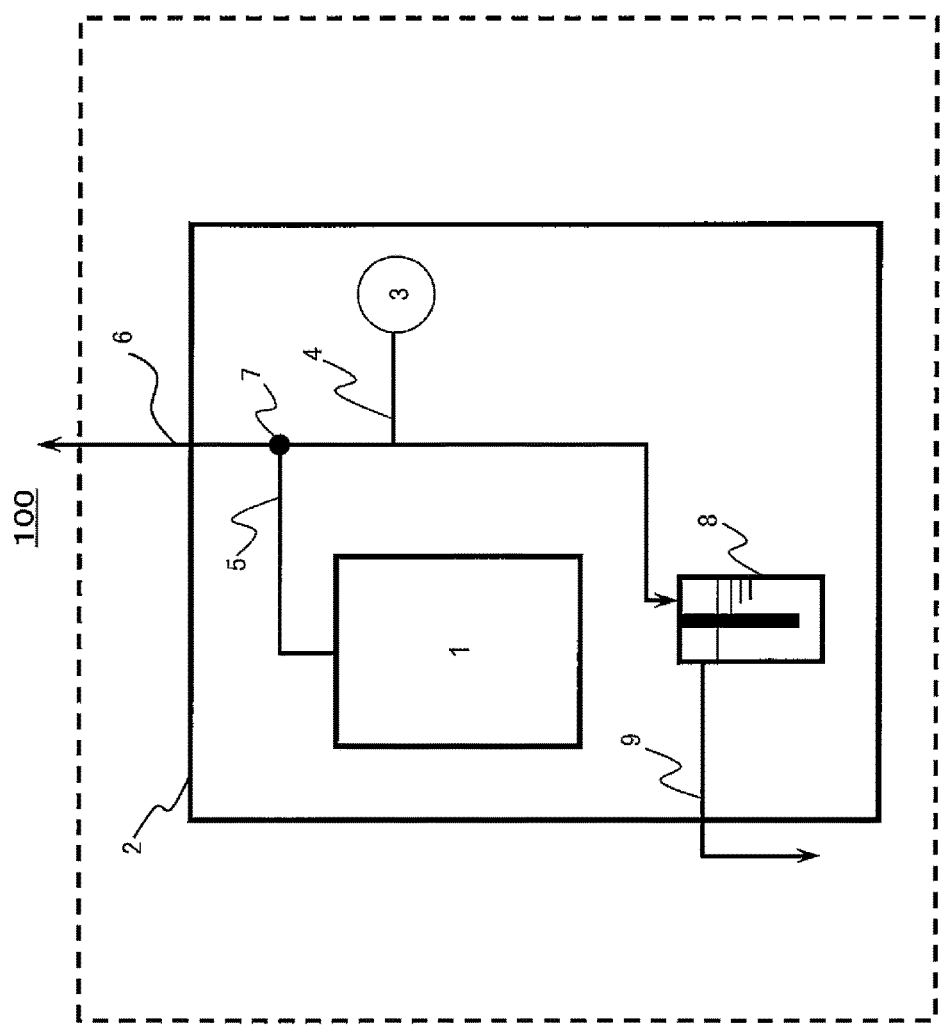
FIG. 2 is a block diagram showing one example of a schematic configuration of the power generation system according to Embodiment 2.

FIG. 2 is a block diagram showing one example of a schematic configuration of the power generation system according to Embodiment 2.

The power generation system 100 of the present embodiment includes the power generation unit 1, the housing 2, the ventilator 3, the first gas channel 4, the second gas channel 5, the merging portion 7, the third gas channel 6, the water trap unit 8, and the water discharge channel 9.

The power generation unit 1 discharges the flue gas. Specifically, examples of the power generation unit 1 include fuel cell units and engine power generation units including gas engines, diesel engines, or stirling engines. In the fuel cell unit, the flue gas may be discharged from a combustor configured to combust a hydrogen-containing gas. In the engine power generation unit, the flue gas may be discharged from an internal combustion engine or an external combustion engine.

In a case where the power generation unit 1 is a fuel cell unit configured to generate power by using the hydrogen-containing gas, the fuel cell may be any type of fuel cell. Examples of the fuel cell include a polymer electrolyte fuel cell, a solid-oxide fuel cell, and a phosphoric-acid fuel cell. The fuel cell unit may include a hydrogen generator, and the fuel cell may generate power by using the hydrogen-containing gas supplied from the hydrogen generator. In a case when the fuel cell is the solid-oxide fuel cell, the hydrogen generator and the fuel cell may be accommodated in a single container.

The housing 2 accommodates the power generation unit 1.

The ventilator 3 ventilates the housing. The ventilator 3 is configured to operate at least during the power generation. For example, the ventilator 3 may be constituted by a blower, a ventilation fan, or the like. For example, the ventilator 3 takes air from the outside of the housing 2 and discharges the air to the first gas channel 4. The ventilator 3 may indirectly take the air from the outside of the housing 2 through an internal space of the housing 2.

The first gas channel 4 is a channel through which the gas discharged from the ventilator 3 flows. More specifically, in the example shown in FIG. 2, the first gas channel 4 is a channel extending from the ventilator 3 to the merging portion 7.

The second gas channel 5 is a channel through which the flue gas from the power generation unit 1 flows. More specifically, in the example shown in FIG. 2, the second gas channel 5 is a channel extending from the power generation unit 1 to the merging portion 7.

The merging portion 7 is a portion where the first gas channel 4 and the second gas channel 5 merge.

The third gas channel 6 is a channel through which the gases merged at the merging portion 7 flow. More specifically, for example, the third gas channel 6 may be a channel whose downstream end is open to the atmosphere. To be specific, the third gas channel 6 may be a channel that connects the merging portion 7 to the atmosphere. Or, the third gas channel 6 may be a channel whose downstream end is connected to a smoke path. To be specific, the third gas channel 6 may be a channel that connects the merging portion 7 to the smoke path.

The water trap unit 8 is connected to the first gas channel 4, is arranged at a position lower than the merging portion 7, and includes the water sealing structure. In the example shown in FIG. 2, the water trap unit 8 is connected to the first gas channel 4 by a branch channel branching from the first gas channel 4 at a branch portion. For example, the water sealing structure may be a water tank or a U-shaped pipe. For example, the route connecting the merging portion 7 and the water trap unit 8 may have a falling gradient such that the condensed water generated at the merging portion 7 flows down to the water trap unit 8 by gravity. For example, the route connecting the third gas channel 6 and the merging portion 7 may have a falling gradient such that the condensed water generated at the third gas channel 6 flows down to the merging portion 7 by gravity. At least a part of the water stored in the water sealing structure may be water other than the condensed water.

In the example shown in FIG. 2, the water trap unit 8 includes a water tank including a first chamber and a second chamber. A dividing wall is provided between the first chamber and the second chamber, and the first chamber and the second chamber communicate with each other through a communication opening located at a lower position of the water trap unit 8. In this example, the communication opening is formed between the dividing wall and a bottom surface of the water trap unit 8. However, the present embodiment is not limited to this example. As long as the communication opening is provided at the lower position of the water trap unit 8, the communication opening may be any opening. For example, the dividing wall may contact the bottom surface, and the communication opening may be an opening formed at a lower portion of the dividing wall. In this example, the water sealing structure is formed by storing the condensed water in the water trap unit 8 such that the water level becomes higher than at least the communication opening.

The condensed water is stored in the first chamber and the second chamber. An upper space of the first chamber communicates with the merging portion 7, and an upper space of the second chamber communicates with the water discharge channel 9. The gas pressure on the water surface in the second chamber is equal to the gas pressure at an exit of the water discharge channel and is substantially equal to the atmospheric pressure. In contrast, the gas pressure on the water surface in the first chamber changes depending on, for example, the discharge pressure of the ventilator 3. A difference between the water levels of the first and second chambers, that is, a so-called water head difference corresponds to water seal pressure.

In this example, the water trap unit 8 is connected to the first gas channel 4 through the branch channel branching from the first gas channel 4. However, the branch channel is not essential. For example, the water trap unit 8 may be disposed on the first gas channel 4.

The water discharge channel 9 is a channel through which the water in the water trap unit 8 is discharged to the outside of the housing 2.

The power generation system 100 may include a controller, not shown. The controller is only required to have a control function. For example, the controller may include a calculation processing portion (not shown) and a storage portion (not shown) configured to store a control program. Examples of the calculation processing portion are an MPU and a CPU. One example of the storage portion is a memory. The controller 11 may be constituted by a single controller configured to perform centralized control or may be constituted by a plurality of controllers that cooperate to perform distributed control.

Operating Method

In the present embodiment, the ventilator 3 is configured to operate at least during power generation. At this time, the gas discharged from the ventilator 3 flows toward the merging portion 7 to flow through the third channel 6 together with the flue gas discharged from the power generation unit 5.

According to this configuration, the discharge pressure of the ventilator 3 is set such that even if the water sealing structure of the water trap unit 8 is broken, the flue gas from the power generation unit 1 does not flow into the route connecting the ventilator 3 and the merging portion 7. Therefore, even if the water sealing structure is broken, the flue gas is prevented from leaking through the water trap unit 8 to the outside.

On this account, the possibility that the flue gas from the power generation unit 1 is discharged from the water discharge channel 9 that is the portion other than the original flue gas system that is the third gas channel can be made lower than the conventional possibility.

In this example, the ventilator 3 is controlled by the controller (not shown) so as to operate at least during the power generation. Specifically, the discharge pressure of the ventilator 3 is set by the controller such that even if the water sealing structure of the water trap unit 8 is broken, the flue gas from the power generation unit 1 does not flow into the route connecting the ventilator 3 and the merging portion 7.

The operation method of the ventilator 3 is not limited to the above example. For example, the discharge pressure of the ventilator 3 may be set manually or may be fixed in advance. The ventilator 3 does not have to be controlled by the controller 3 so as to operate at least during the power generation. The ventilator 3 may be configured to operate at all times in such a manner that by tuning on the power generation system, power is also supplied to the ventilator 3. To be specific, as long as the ventilator 3 is configured to operate at least during the power generation, any configuration is adoptable.

Modification Example 1

The power generation system of Modification Example 1 is configured to operate such that in the power generation system of Embodiment 1 or 2, the discharge pressure of the ventilator becomes lower than water seal pressure of the water trap unit.

According to this configuration, the possibility that the water seal function is broken due to the influence of the ventilator can be made lower than the conventional possibility.

The device configuration of the power generation system according to Modification Example 1 can be configured in the same manner as FIG. 2. Therefore, the same reference signs and names are used for the same components as in FIG. 2, and explanations thereof are omitted.

The water seal pressure is pressure required to break the water seal function (the same is true hereinafter). In the example shown in FIG. 2, pressure generated by the water head difference between the first chamber and the second chamber becomes the water seal pressure. In the example shown in FIG. 2, the water seal pressure can be set by adjusting the water head difference between a discharge port through which the water in the water trap unit 8 is discharged to the water discharge channel and the communication opening through which the first chamber and the second chamber communicate with each other, that is, the difference in height in the vertical direction between the discharge port and the communication opening.

In this example, the discharge pressure of the ventilator 3 is set by the controller (not shown) so as to become lower than the water seal pressure of the water trap unit 8. However, this example is not limited to this. Specifically, for example, the discharge pressure of the ventilator 3 may be manually set so as to become lower than the water seal pressure of the water trap unit 8 or may be set as discharge pressure fixed in advance. To be specific, as long as the ventilator 3 is configured to operate such that the discharge pressure becomes lower than the water seal pressure of the water trap unit 8, any configuration is adoptable.

Since the pressure loss occurs at the route connecting the ventilator 3 and the water trap unit 8, the pressure applied to the water surface in the water trap unit 8 becomes lower than the discharge pressure of the ventilator 3. However, even if pressure equal to the discharge pressure of the ventilator 3 is applied to the water surface, it does not exceed the water seal pressure. Therefore, the possibility that the water seal function of the water trap unit 8 is broken by the discharge pressure of the ventilator 3 can be reduced.

Modification Example 2

The power generation system of Modification Example 2 is configured such that in the power generation system of any one of Embodiments 1 and 2 and Modification Example 1, the ventilator is configured to operate such that discharge pressure thereof becomes higher than gas pressure on a water surface in the water trap unit.

According to this configuration, the possibility that the flue gas from the power generation unit is discharged from the portion other than the original flue gas system can be further reduced.

The device configuration of the power generation system according to Modification Example 2 can be configured in the same manner as FIG. 2. Therefore, the same reference signs and names are used for the same components as in FIG. 2, and detailed explanations thereof are omitted.

In this example, the discharge pressure of the ventilator 3 is controlled by the controller (not shown) so as to become higher than the gas pressure on the water surface in the water trap unit 8. However, this example is not limited to this. Specifically, for example, the discharge pressure of the ventilator 3 may be set manually so as to become higher than the gas pressure on the water surface in the water trap unit 8 or may be set as the discharge pressure fixed in advance. To be specific, as long as the ventilator 3 is configured such that the discharge pressure thereof is not higher than the gas pressure on the water surface in the water trap unit 8, any configuration is adoptable.

If the discharge pressure of the ventilator 3 becomes equal to or lower than the gas pressure on the water surface in the water trap unit 8, the pressure of the flue gas from the power generation unit 1 relatively becomes high. Therefore, the possibility that the flue gas flows into the route connecting the ventilator 3 and the merging portion 7 becomes high. In a case where the discharge pressure of the ventilator 3 is made higher than the gas pressure on the water surface in the water trap unit 8, the possibility that the flue gas from the power generation unit 1 flows backward from the merging portion 7 to the branch portion can be reduced. On this account, the possibility that the flue gas from the power generation unit 1 is discharged from the portion other than the original flue gas system can be further reduced.

Modification Example 3

The power generation system of Modification Example 3 is configured such that in the power generation system of any one of Embodiments 1 and 2 and Modification Examples 1 and 2, the water seal pressure of the water trap unit becomes higher than pressure loss at a route connecting the merging portion and the atmosphere through the third gas channel.

According to this configuration, the possibility that the water seal function is broken by the pressure at the merging portion generated by the pressure loss at the route connecting the merging portion and the atmosphere through the third gas channel is reduced.

The device configuration of the power generation system according to Modification Example 3 can be configured in the same manner as in FIG. 2. Therefore, the same reference signs and names are used for the same components as in FIG. 2, and detailed explanations thereof are omitted.

The pressure at the merging portion becomes higher than the atmospheric pressure because of the pressure loss at the route connecting the merging portion and the atmosphere through the third gas channel. If the pressure at the merging portion becomes higher than the water seal pressure, the water seal function may be broken. According to the configuration of Modification Example 3, the possibility that the water seal function is broken by the pressure at the merging portion generated by the pressure loss at the route connecting the merging portion and the atmosphere through the third gas channel is reduced.

Modification Example 4

The power generation system of Modification Example 4 is configured such that in the power generation system of any one of Embodiments 1 and 2 and Modification Examples 1, 2, and 3, pressure loss at a route extending from the ventilator through the water trap unit to an exit of the water discharge channel when water seal of the water trap unit is broken is set such that entire gas discharged from the ventilator does not flow to the route extending through the water trap unit to the exit of the water discharge channel when the water seal of the water trap unit is broken.

According to this configuration, even if the water sealing structure of the water trap unit is broken, the flue gas of the power generation unit hardly flows into the water trap unit. Therefore, the possibility that the flue gas from the power generation unit is discharged from the portion other than the original flue gas system can be further reduced.

The device configuration of the power generation system according to Modification Example 4 can be configured in the same manner as in FIG. 2. Therefore, the same reference signs and names are used for the same components as in FIG. 2, and detailed explanations thereof are omitted.

In Modification Example 4, the pressure loss at the route extending from the ventilator 3 through the water trap unit 8 to the exit of the water discharge channel 9 when the water seal of the water trap unit 8 is broken is set such that the entire gas discharged from the ventilator 3 does not flow to the route extending through the water trap unit to the exit of the water discharge channel.

Therefore, even if the water seal function is broken, the entire gas discharged from the ventilator 3 does not flows to the route extending through the water trap unit 8 to the exit of the water discharge channel 9. On this account, the possibility that the flue gas from the power generation unit 1 is discharged from the portion other than the original flue gas system can be further effectively reduced.

Embodiment 3

The power generation system of Embodiment 3 is configured such that the power generation system of any one of Embodiments 1 and 2 and Modification Examples 1, 2, 3, and 4 includes: a pressure detector configured to detect gas pressure on a water surface in the water trap unit; and a controller configured to stop a power generating operation of the power generation system when the gas pressure on the water surface in the water trap unit becomes equal to or higher than a threshold lower than water seal pressure of the water trap unit.

According to this configuration, before the water seal function of the water trap unit is broken, the power generating operation of the power generation system is stopped. Therefore, the possibility that the flue gas from the power generation unit is discharged from the portion other than the original flue gas system can be further effectively reduced.

Device Configuration

Figure 3:
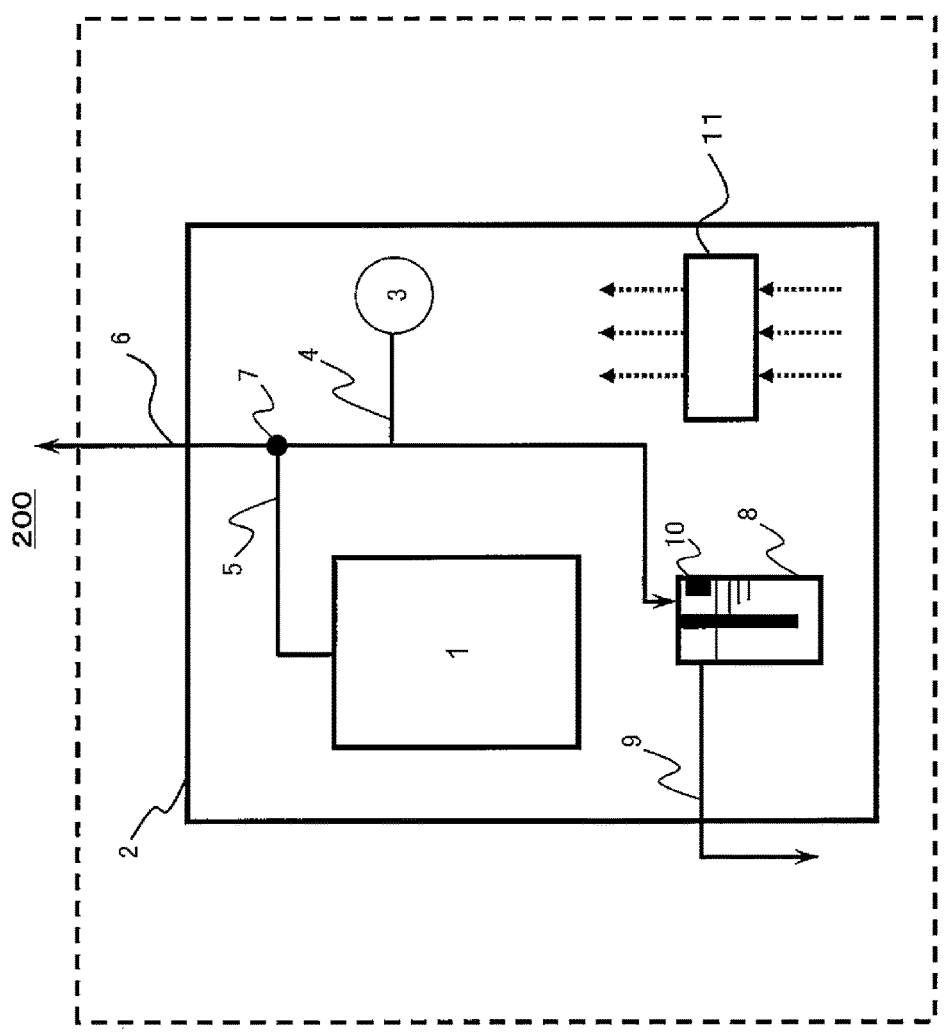
FIG. 3 is a block diagram showing one example of a schematic configuration of the power generation system according to Embodiment 3.

FIG. 3 is a block diagram showing one example of a schematic configuration of the power generation system according to Embodiment 3.

A power generation system 200 of the present embodiment can be configured in the same manner as the power generation system 100 of FIG. 2 except that the power generation system 200 further includes a pressure detector 10 and a controller 11. Therefore, in FIG. 3, the same reference signs and names are used for the same components as in FIG. 2, and detailed explanations thereof are omitted.

The pressure detector 10 detects the gas pressure on the water surface in the water trap unit 8. As long as the pressure detector 10 can detect the gas pressure on the water surface in the water trap unit 8, it can be arranged anywhere. In the example shown in FIG. 3, the pressure detector 10 is provided inside the water trap unit 8. For example, the pressure detector 10 may be provided at the branch channel extending from the branch portion to the water trap unit 8, the branch portion, the channel extending from the branch portion to the merging portion 7, or the channel extending from the ventilator 3 to the branch portion.

When the gas pressure on the water surface in the water trap unit 8 becomes equal to or higher than the threshold lower than the water seal pressure of the water trap unit 8, the controller 11 stops the power generating operation of the power generation system 200.

The controller 11 is only required to have a control function. For example, the controller 11 may include a calculation processing portion (not shown) and a storage portion (not shown) configured to store a control program. Examples of the calculation processing portion include an MPU and a CPU. One example of the storage portion is a memory. The controller 11 may be constituted by a single controller configured to perform centralized control or may be constituted by a plurality of controllers that cooperate to perform distributed control.

Operating Method

Figure 4:
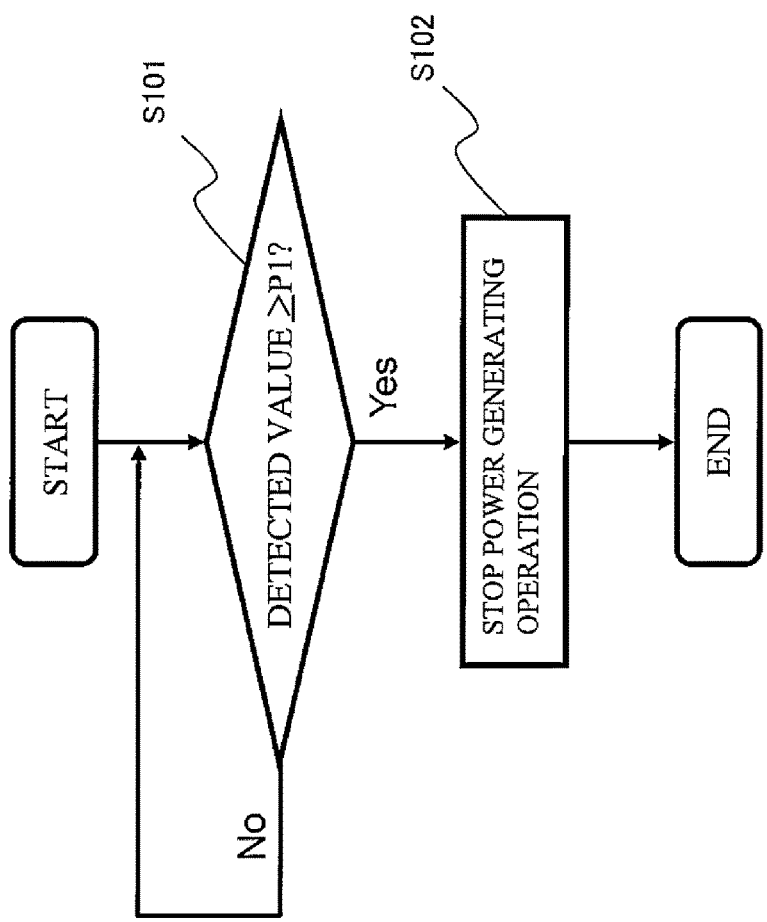
FIG. 4 is a flow chart showing one example of a method of operating the power generation system according to Embodiment 3.

FIG. 4 is a flow chart showing one example of a method of operating the power generation system according to Embodiment 3. For example, the control shown in FIG. 4 is executed in such a manner that the controller 11 controls respective components of the power generation system 200.

When the operation of the power generation system 200 is started (START), the controller 11 receives from the pressure detector 10 a detected value of the gas pressure on the water surface in the water trap unit 8 to determine whether or not the detected value is equal to or higher than a threshold P1 (Step S101). The threshold is set as a value for determining that the water sealing structure of the water trap unit 8 may be broken. Specifically, the threshold is set to a value lower than the water seal pressure of the water trap unit 8.

If no in Step S101, Step S101 is repeated.

If yes in Step S101, the controller 11 stops the power generating operation of the power generation system 200 (Step S102). Then, the operation of the power generation system is terminated (END).

If the gas pressure on the water surface in the water trap unit 8 becomes equal to or higher than the water seal pressure of the water trap unit 8, the water seal function may be broken. At this time, the flue gas from the power generation unit may be discharged through the water trap unit 8 and the water discharge channel 9 to the outside of the power generation system 200.

According to the operating method of the present embodiment, when the gas pressure on the water surface in the water trap unit 8 reaches the threshold P1 lower than the water seal pressure of the water trap unit 8, the power generating operation of the power generation system is stopped. The possibility that the gas pressure on the water surface in the water trap unit 8 exceeds the water seal pressure of the water trap unit 8 is reduced. Therefore, the possibility that the flue gas from the power generation unit 1 is discharged through the water trap unit 8 and the water discharge channel 9 to the outside of the power generation system 200 is reduced. On this account, the possibility that the flue gas from the power generation unit is discharged from the portion other than the original flue gas system can be further effectively reduced.

Embodiment 4

The power generation system of Embodiment 4 is configured such that in the power generation system of any one of Embodiments 1, 2, and 3 and Modification Examples 1, 2, 3, and 4, a flue gas channel of an external combustion device is connected to the third gas channel, and the ventilator operates at least during power generation of the power generation unit and a combustion operation of the external combustion device.

According to this configuration, the possibility that the flue gas from the external combustion device is discharged from the portion other than the original flue gas system can be made lower than the conventional possibility.

FIG. 5 is a block diagram showing one example of a schematic configuration of the power generation system according to Embodiment 4.

A power generation system 400 of the present embodiment can be configured in the same manner as the power generation system 100 of FIG. 2 except that the power generation system 400 further includes an external combustion device 300. To be specific, the internal configuration of the power generation system 400 in FIG. 5 can be configured in the same manner as the internal configuration of the power generation system 100 in FIG. 2. Therefore, the internal configuration of the power generation system 400 is not shown. In FIG. 5, the same reference signs and names are used for the same components as in FIG. 2, and detailed explanations thereof are omitted.

As shown in FIG. 5, the flue gas channel of the external combustion device 300 is connected to the third gas channel 6. For example, the external combustion device 300 may be a heat supply device, such as a boiler. The power generation system 400 and the external combustion device 300 may operate in cooperation or independently. In this example, the external combustion device 200 is provided as a device that is not a part of the power generation system 400 but may be configured as a part of the power generation system 400.

The ventilator 3 is configured to operate at least during the power generation of the power generation unit 1 and the combustion operation of the external combustion device 200.

In a case where the flue gas channel of the external combustion device 300 is connected to the third gas channel 6, the condensed water derived from the flue gas from the external combustion device 300 flows from the third gas channel 6 through the merging portion 7 and the branch channel to the water trap unit 8. In contrast, the flue gas of the external combustion device 300 may flow through the third gas channel 6, the merging portion 7, the branch channel, and the water trap unit 8 to be discharged from the water discharge channel 9.

However, in the configuration of the present embodiment, the ventilator 3 is configured to operate at least during the power generation of the power generation unit and the combustion operation of the external combustion device. Therefore, the possibility that the flue gas of the external combustion device 300 flows through the third gas channel 6, the merging portion 7, the branch channel, the water trap unit 8, and the water discharge channel 9 to be discharged to the outside is made lower than that in a case when the ventilator 3 does not operate during the combustion operation of the external combustion device 300.

To be specific, the possibility that the flue gas from the external combustion device is discharged from the portion other than the original flue gas system can be made lower than the conventional possibility.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

One aspect of the present invention is useful as the power generation system configured such that the possibility that the flue gas from the power generation unit is discharged from the portion other than the original flue gas system can be made lower than the conventional possibility.

REFERENCE SIGNS LIST

1 power generation unit
2 housing
3 ventilator
4 first gas channel
5 second gas channel
6 third gas channel
7 merging portion
8 water trap unit
9 water discharge channel
10 pressure detector
11 controller
100, 200 power generation system
300 external combustion device
400 power generation system

The invention claimed is:

1. A power generation system comprising:
   a power generation unit configured to discharge a flue gas;
   a housing configured to accommodate the power generation unit;
   a ventilator configured to ventilate the housing;
   a first gas channel through which a gas discharged from the ventilator flows;
   a second gas channel through which the flue gas from the power generation unit flows;
   a merging portion where the first gas channel and the second gas channel merge;
   a third gas channel through which the gases merged at the merging portion flow;
   a water trap unit connected to a portion of the first gas channel, the portion being located upstream of the merging portion, and including a water sealing structure; and
   a water discharge channel through which water in the water trap unit is discharged to an outside of the housing.

2. The power generation system according to claim 1, wherein the water trap unit is arranged at a position lower than the merging portion.

3. The power generation system according to claim 1, wherein the ventilator is configured to operate during at least a part of a period in which the flue gas discharged from the power generation unit flows through the second gas channel and the third gas channel.

4. The power generation system according to claim 1, wherein the ventilator is configured to operate at least during a part of power generation.

5. The power generation system according to claim 1, wherein the ventilator is configured to operate at least during power generation.

6. The power generation system according to claim 1, wherein the ventilator is configured to operate such that discharge pressure thereof becomes lower than water seal pressure of the water trap unit.

7. The power generation system according to claim 1, wherein the ventilator is configured to operate such that discharge pressure thereof becomes higher than gas pressure on a water surface in the water trap unit.

8. The power generation system according to claim 1, wherein the water trap unit is configured such that water seal pressure thereof becomes higher than pressure loss at a route connecting the merging portion and the atmosphere through the third gas channel.

9. The power generation system according to claim 1, wherein pressure loss at a route extending from the ventilator through the water trap unit to an exit of the water discharge channel when water seal of the water trap unit is broken is set such that entire gas discharged from the ventilator does not flow to the route extending through the water trap unit to the exit of the water discharge channel when the water seal of the water trap unit is broken.

10. The power generation system according to claim 1, further comprising:
- a pressure detector configured to detect gas pressure on a water surface in the water trap unit; and
- a controller configured to stop a power generating operation of the power generation system when the gas pressure on the water surface in the water trap unit becomes equal to or higher than a threshold lower than water seal pressure of the water trap unit.

11. The power generation system according to claim 1, wherein:
- a flue gas channel of an external combustion device is connected to the third gas channel; and
- the ventilator is configured to operate at least during power generation of the power generation unit and a combustion operation of the external combustion device.

* * * * *